July 27, 1926.
L. C. BAYLES
1,593,561
DUSTLESS ROCK DRILL
Filed March 12, 1925
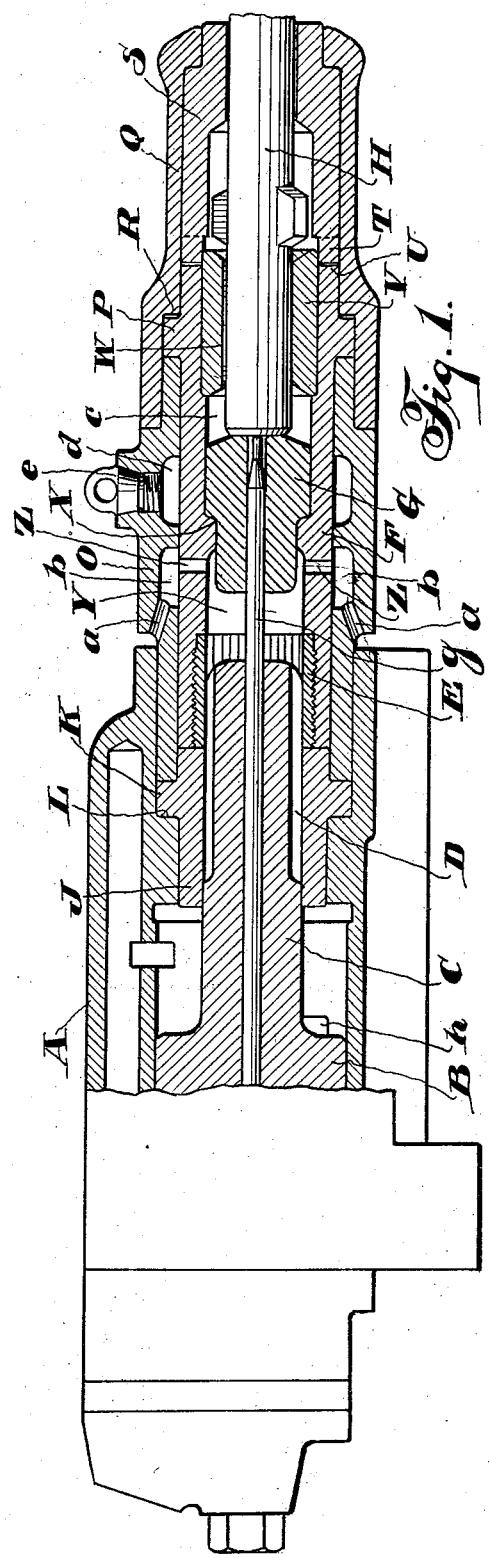
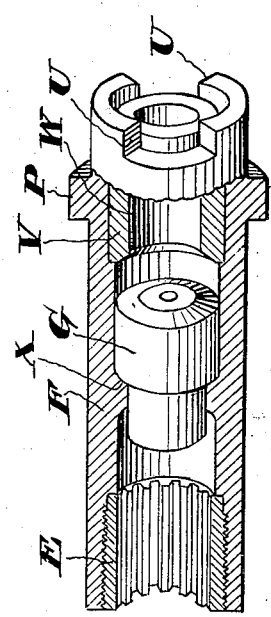
INVENTOR.
Lewis C. Bayles
BY Herbert Ogden
HIS ATTORNEYS.

Patented July 27, 1926.

1,593,561

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

DUSTLESS ROCK DRILL.

Application filed March 12, 1925. Serial No. 14,949.

This invention relates to rock drills but more particularly to means for preventing the formation of dust while drilling.

The objects of the invention are to maintain the chuck cavity at substantially atmospheric pressure, prevent air from commingling with the cleansing water in passing to the drill steel and avoid the sucking of dirt and extraneous material into the front end parts of the rock drill.

To these ends the invention consists of the combinations of elements and features of construction shown in the accompanying drawings, in which—

Figure 1 is a side view partly in longitudinal section, showing so much of a rock drill as will serve to illustrate the invention, Figure 2 is a detail side view partly in longitudinal section and partly in perspective, showing the chuck and parts cooperating therewith, and Figure 3 is a view similar to Figure 2, showing the chuck jaw.

Referring to the drawings, a cylinder A of the rock drill is provided with the reciprocating piston B having the forward shank C upon which are formed the usual flutes D cooperating with the fluted chuck nut E in the chuck F. The blows of impact of the piston are transmitted through the anvil block G to the shank of the lugged drill steel H extending into the front end of the rock drill. The water tube $g$ has a working fit in the anvil block and the anvil block has a working fit in the chuck.

The forward shank of the piston extends through the front cylinder washer J having a flange K bearing against a shoulder L in the cylinder, and a front cylinder extension O extends within the cylinder against the flange K of the washer which provides a firm bearing for the front cylinder extension against the washer and between the cylinder A and the chuck F.

The chuck F is rotatable in the cylinder extension O and is provided with an external flange P adapted to bear against the cylinder extension O, and the front head Q is provided with a shoulder R for holding the chuck in position, slight clearance preferably being provided between the front head shoulder R and the chuck flange P. The parts are held together by the usual side bolts (not shown). The loose chuck member S is located within the front head and is provided with the jaws T cooperating with the jaws U on the chuck F. The chuck sleeve V within the forward end of the chuck is preferably provided with a longitudinal hole or slot W for the free passage to atmosphere of any air which may leak into the chuck parts. The chuck F is also provided with an internal shoulder X forming a stop for the anvil block G.

The relative lengths of the smooth and fluted portions of the forward shank of the piston are such with relation to the stroke of the piston, that the flutes are sealed from the main piston chamber as indicated in Figure 1 until such time as the main exhaust port $h$ shall be open to atmosphere, in which case there will be no pressure in the front end of the cylinder. In Figure 1 the piston is shown nearing the rearward end of its rearward stroke, and the exhaust port $h$ is already opened so that when the flutes pull back into the cylinder, there will be no pressure in the forward end of the cylinder. No air passes from the cylinder to the chuck cavity Y in the rearward portion of the chuck except such a small quantity of air as may be due to leakage. The chuck F is provided with the vents Z sufficiently forward in the chuck so that during the normal operation of the drill the said vents will not be covered by the piston shank C and the front cylinder extension O is provided with the rearwardly directed vents $a$ preferably located close to the forward end of the cylinder to aid in keeping out dirt while between the two sets of vents is provided a cavity or chamber $b$ of substantial volume which acts as a settling chamber and prevents dirt and extraneous material from being sucked back into the front end parts of the machine in case there is any tendency to form a partial vacuum in said parts during the operation of the piston. The vents Z preferably lead from the front end of the chuck cavity Y and communicate at their outer ends with the front end of the chamber $b$ so that any dirt or dust which may be sucked into the chamber $b$ may settle on the walls thereof instead of being drawn into the chuck cavity Y. Since the chuck cavity Y is maintained substantially at atmospheric pressure, there is no fluid pressure on the anvil block G tending to force air past or through the anvil block, but any air which may leak into the cavity $c$ into which the shank of the steel extends will pass to atmosphere through the groove W in the chuck sleeve V. Efficient means are provided for lubricating the front end parts of the rock drill by providing an annular oil chamber $d$ preferably in the front cylinder extension at a point forward of the vents Z and $a$ and this chamber is provided with the filling plug $e$ as usual.

I claim:

1. In a rock drill, the combination of a cylinder, a reciprocating piston having a forward shank provided with flutes, said flutes being adapted to remain out of communication with the cylinder during the presence of pressure fluid in said cylinder, a front cylinder extension supported by the cylinder and having a settling chamber of substantial volume, a chuck rotatable in the front cylinder extension and having a chuck cavity, radial vents leading from the chuck cavity to the front end of the settling chamber, and vents leading from the rearward end of the settling chamber to the atmosphere to permit the escape of pressure fluid leaking from the cylinder into the chuck and into the settling chamber, the last said vents being directed rearwardly to prevent the admission of dirt and extraneous material into the rock drill.

2. In a rock drill, the combination of a cylinder, a reciprocating piston having a forward shank provided with flutes, said flutes being adapted to remain out of communication with the cylinder during the presence of pressure fluid in said cylinder, a front cylinder extension supported by the cylinder and having a settling chamber of substantial volume, an annular oil chamber in the front cylinder extension located forwardly of the settling chamber, a chuck having a cavity and rotatable in the front cylinder extension and in the oil chamber, said chuck having radial vents leading from the front end of the cavity to the front end of the settling chamber, said vents being normally out of reach of the piston shank, and vents leading from the rearward end of the settling chamber to the atmosphere to permit the escape of pressure fluid leaking from the cylinder into the chuck and into the settling chamber, the last said vents being directed rearwardly to prevent the admission of dirt and extraneous material into the rock drill.

In testimony whereof I have signed this specification.

LEWIS C. BAYLES.